(12) United States Patent
Landow et al.

(10) Patent No.: US 8,424,037 B2
(45) Date of Patent: Apr. 16, 2013

(54) APPARATUS, SYSTEMS AND METHODS FOR ACCESSING AND SYNCHRONIZING PRESENTATION OF MEDIA CONTENT AND SUPPLEMENTAL MEDIA RICH CONTENT IN RESPONSE TO SELECTION OF A PRESENTED OBJECT

(75) Inventors: Kate Landow, Denver, CO (US); John Anthony Card, Denver, CO (US); Daniel Overbaugh, Aurora, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 153 days.

(21) Appl. No.: 12/968,007

(22) Filed: Dec. 14, 2010

(65) Prior Publication Data

US 2011/0321096 A1    Dec. 29, 2011

Related U.S. Application Data

(60) Provisional application No. 61/359,742, filed on Jun. 29, 2010.

(51) Int. Cl.
*H04N 5/445* (2011.01)

(52) U.S. Cl.
USPC .............................................. 725/43; 725/41

(58) Field of Classification Search .................... 725/41, 725/43
See application file for complete search history.

(56) References Cited

U.S. PATENT DOCUMENTS

| | | | |
|---|---|---|---|
| 7,536,706 B1 | 5/2009 | Sezan et al. | |
| 2003/0145338 A1* | 7/2003 | Harrington | 725/136 |
| 2003/0149983 A1* | 8/2003 | Markel | 725/51 |
| 2003/0229900 A1* | 12/2003 | Reisman | 725/87 |
| 2004/0261130 A1* | 12/2004 | Leak et al. | 725/136 |
| 2007/0250901 A1* | 10/2007 | McIntire et al. | 725/146 |

(Continued)

FOREIGN PATENT DOCUMENTS

EP      0982947 A2     3/2000

OTHER PUBLICATIONS

Jim Wilkinson et al., The Material Exchange Format (MXF) and its Application; Presented at the 143rd SMPTE Technical Conference and Exhibition (paper No. 17) in New York City, Nov. 4-7, 2001. The content was updated on Jun. 21, 2002; SMPTE Journal, Sep. 2002; www.smpte.org; 7 pages.

Joint Technical Committe et al.; Hybrid Broadcast Broadband TV; ETSI TS 102 796 V1.1.1 (Jun. 2010) Technical Specification; European Broadcasting Union, CH-1218 Grand Saconnex (Geneva), Switzerland; 75 pages.

(Continued)

*Primary Examiner* — Vivek Srivastava
*Assistant Examiner* — Junior Mendoza
(74) *Attorney, Agent, or Firm* — Lowe Graham Jones PLLC

(57) ABSTRACT

Media rich content systems and methods are operable to provide access to supplemental media rich content in response to user selection of a presented object of interest. An exemplary embodiment receives at a media device a video stream comprising at least a plurality of video frames, wherein at least one of the video frames is configured to present an object of interest; processes a supplemental media rich content trigger associated with the at least one video frame, wherein the supplemental media rich content trigger comprises information that identifies a region where the object of interest is presented in the video frame, and comprises information configured to access supplemental media rich content associated with the object of interest; receives a user selection of the object of interest presented in the at least one video frame; and presents the supplemental media rich content on a presentation device.

19 Claims, 4 Drawing Sheets

U.S. PATENT DOCUMENTS

| | | | | |
|---|---|---|---|---|
| 2009/0327894 | A1* | 12/2009 | Rakib et al. | 715/719 |
| 2010/0058397 | A1* | 3/2010 | Rogers | 725/60 |
| 2010/0312596 | A1* | 12/2010 | Saffari et al. | 705/7 |
| 2011/0131602 | A1* | 6/2011 | Fuisz | 725/32 |
| 2011/0292992 | A1* | 12/2011 | Sirivara | 375/240.01 |
| 2011/0320627 | A1* | 12/2011 | Landow et al. | 709/231 |

OTHER PUBLICATIONS

P. Ferreira, MXF—A Progress Report; EBU Technical Review—2010 Q3; This version: Jul. 23, 2010; Published by the European Broadcasting Union, Geneva, Switzerland; ISSN: 1609-1469; 12 pages.

* cited by examiner

APPARATUS, SYSTEMS AND METHODS FOR ACCESSING AND SYNCHRONIZING PRESENTATION OF MEDIA CONTENT AND SUPPLEMENTAL MEDIA RICH CONTENT IN RESPONSE TO SELECTION OF A PRESENTED OBJECT

CROSS REFERENCE TO RELATED APPLICATIONS

This application claims the benefit of and priority to co-pending U.S. utility application entitled, "Apparatus, System And Methods For Accessing And Synchronizing Presentation Of Media Content And Supplemental Media Rich Content," having application Ser. No. 61/359,742, filed Jun. 29, 2010, and which is entirely incorporated herein by reference.

BACKGROUND

Media devices, such as a set top box, are configured to receive media content. The received media content may be presented on a media presentation device, such as a television, computer system, game system, or the like. The media content, such as a television program, a broadcast sports event, a movie, or the like, is received in the form of a video stream and a synchronized audio stream. Once received and processed, the video stream is presented on a display and the associated audio stream is output from one or more speakers in a synchronized fashion.

In some situations, supplemental media rich content pertaining to the presented media content may be available from other locations. For example, an internet site may provide supplemental media rich content pertaining to the currently received program, sporting event, or movie. However, for optimum enjoyment by the user, the supplemental media rich content needs to be accessed and synchronized with the media content as it is being presented to the user.

Further, within the video itself, various recognizable objects may be presented to the user. For example, an image of an object of interest, such as an actor, a beverage container, or an automobile, may be shown in the presented video. If the user is interested in accessing a web site or the like that provides supplemental media rich content related to the object of interest, or even allows purchase of the object of interest, the user may make a mental note of the object of interest so that they may later find a suitable website pertaining to the object of interest. In some situations, the user might even write themselves a descriptive note or the like so as to improve their recall of the object of interest when they later go to find and access the website.

Accordingly, there is a need in the arts to provide access to supplemental media rich content that is associated with a recognizable object of interest that is shown in the presented video portion of the media content.

SUMMARY

Systems and methods of providing access to supplemental media rich content in response to user selection of a presented object of interest are disclosed. An exemplary embodiment receives at a media device a video stream comprising at least a plurality of video frames, wherein at least one of the video frames is configured to present an object of interest; processes a supplemental media rich content trigger associated with the at least one video frame, wherein the supplemental media rich content trigger comprises information that identifies a region where the object of interest is presented in the video frame, and comprises information configured to access supplemental media rich content associated with the object of interest; receives a user selection of the object of interest presented in the at least one video frame; and presents the supplemental media rich content on a presentation device.

Another exemplary embodiment identifies an object of interest in a video frame; determines a geometric region in the video frame corresponding to a location in the video frame where the object of interest is presented; generates a supplemental media rich content trigger, wherein the supplemental media rich content trigger comprises information corresponding to the geometric region, and comprises information configured to cause a media device to access a media rich content server having supplemental media rich content associated with the object of interest; and incorporates the generated supplemental media rich content trigger into a media content stream wherein the video frame resides.

BRIEF DESCRIPTION OF THE DRAWINGS

Preferred and alternative embodiments are described in detail below with reference to the following drawings.

DETAILED DESCRIPTION

Figure 1:
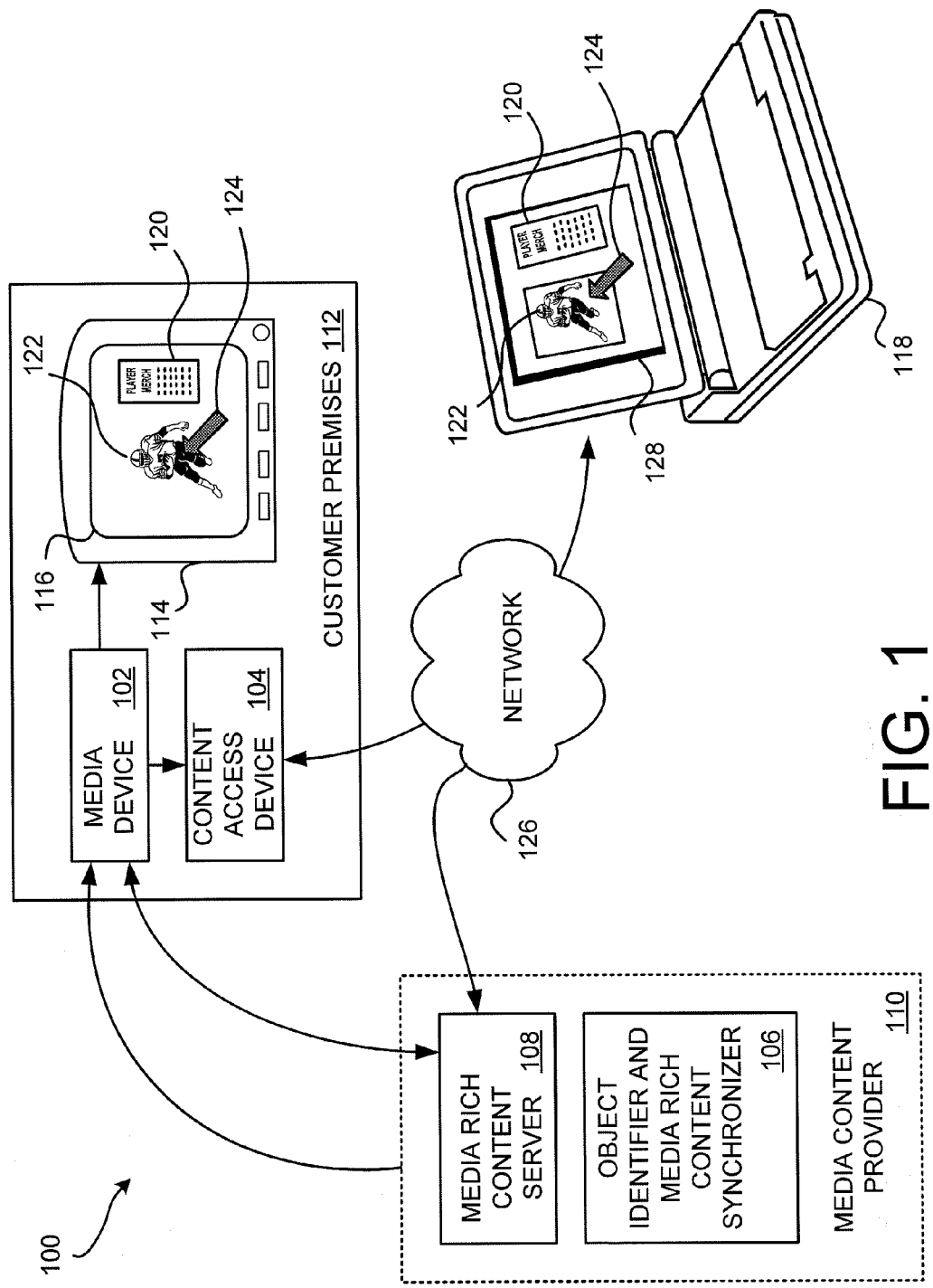
FIG. 1 is a block diagram of an embodiment of an exemplary media access system.

FIG. 1 is a block diagram of an embodiment of an exemplary media access system 100. Embodiments of the media access system 100 comprise a media device 102, an optional content access device 104, an object identifier and media rich content synchronizer 106, and an optional media rich content server 108.

Examples of the media device 102 include, but are not limited to, a set top box (STB) or the like, that is configured to receive media content from a media content provider 110. The media device 102 may be located at a customer premises 112, such as their residence, office, or other suitable location. The media device 102 is typically connected to one or more media presentation devices 114. Non-limiting examples of the media presentation devices 114 include televisions (TVs), stereos, surround-sound receivers, radios, digital video disc (DVD) players, digital video recorders (DVRs), game playing devices, or personal computers (PCs). The media presentation device 114 may include a visual display device 116, such as a television (hereafter, generically a TV). Other types of output devices may also be coupled to the media device 102, such as an audio presentation device and/or those providing any sort of stimuli sensible by a human being, such as temperature, vibration and the like. For example, the media presentation device 114 is illustrated as a TV that includes a display 116 that is presenting a video portion of a football game.

In some situations, supplemental media rich content pertaining to the program of interest may be available from a remote source. More particularly, the available supplemental media rich content may pertain to an identifiable object of interest that is being presented on the TV 114 and/or the portable media device 118. In this exemplary embodiment, the media rich content is content that pertains to the media content, but is not included as part of the originally generated media content.

In other situations, the media rich content pertaining to the media content is included as part of the originally generated media content. For example, the media rich content may be included as part of the originally generated media content. Alternatively, or additionally, the media rich content may be added into the media content after the media content is originally generated.

In an exemplary embodiment, the supplemental media rich content may comprise a menu, a pop-up window, a web page, or the like. In some instances, the supplemental media rich content may be presented as audio information. For example, the supplemental media rich content may comprise audio available from an MP3 library, with the supplemental media rich content presenting audio information or music such as liner notes or related music scores.

In an exemplary embodiment, the media rich content server 108 functions as a repository of the supplemental media rich content pertaining to one or more presented identifiable objects of interest. As the selected program of interest is presented to the user, embodiments of the media access system 100 permit the user to operate the media device 102 and/or the portable media device 118 to access the supplemental media rich content pertaining to the selected object of interest that is being is presented on the TV 114 and/or the portable media device 118. Once the user has selected the object of interest, the related supplemental media rich content is presented as graphical content 120 on the TV 114 and/or the portable media device 118.

In some applications, the graphical content 120 corresponding to the supplemental media rich content may simply present information of interest pertaining to the selected object of interest. In other applications, the graphical content 120 associated with the supplemental media rich content may be interactive with the user. In an exemplary embodiment, the graphical content 120 may present a choice to the user that is intended to be responded to by the user. For example, the user may be able to vote on a issue or the like that is related to the presented object of interest.

As another non-limiting example, the graphical content 120 may be an advertisement that is configured to allow the user to selectively purchase a product in the advertisement. The advertisement may be related to, or may not be related to, the subject matter of the object of interest. For example, the graphical content 120 presented as an advertisement (the supplemental media rich content) may be targeted to the user to induce the purchase of a product that is related to, or is even competing with, the selected object of interest.

FIG. 1 illustrates presentation of a football game on the TV 114. For example, a sports broadcasting entity may be broadcasting a football game that is communicated to the user's media device 102 and/or portable media device 118. Exemplary supplemental media rich content may include game or player statistics that are available from another resource. Player, team, and/or game merchandise may also be available from the web site. In this example, the football player 122 is an identifiable object of interest that is being presented on the video portion of the program of interest presented on the display 116.

In this exemplary embodiment, the user may navigate a pointer 124 about the display to overlay, or be in proximity to, the football player 122. Upon selection, such as by actuation a controller that is used to navigate the pointer 124 about the display 116, supplemental media rich content associated with the football player is accessed from the media rich content server 108 and is presented on the display 116 as the graphical content 120. In an advertisement application, the presented interactive graphical content 120 associated with supplemental media rich content may correspond to merchandise or the like pertaining to the player 122, the player's team, other teams, or the sports in general, that the user may be interested in purchasing. In this simplified example, the merchandise may be available for purchase by accessing the media rich content server 108, and then placing their merchandise order through the media rich content server 108. In an exemplary embodiment, if the user is interested in purchasing one or more items of merchandise, the user simply navigates the pointer 124 about the presented graphical content 120 and makes their purchase selection.

In another exemplary application, the interactive graphical content 120 may permit the user to play a game, or may launch presentation of the game. In some exemplary game applications, a special control panel, consol, or the like may be presented around the selected object of interest to provide interactive capability between the user, the game, and the presented program of interest. The user may interact with the presented graphical content 120 by inputting commands and/or instructions using their media device 102, their portable media device 118, or a suitable controller. In some interactive game applications, the user may toggle or switch between game playing enabled by the supplemental media rich content and the presentation of the program of interest.

The graphical content 120 may be presented in a variety of formats. The graphical content 120 may present the supplemental media rich content using text, images, videos, and/or graphical icons. In an exemplary embodiment, the graphical content 120 may comprise a menu, a pop-up window, a web page, or the like. In some instances, the supplemental media rich content may be presented as audio information from a presentation device configured to produce audio information. For example, the supplemental media rich content may comprise audio available from an MP3 library, with the supplemental media rich content presenting audio information, such as liner notes, music, such as related music scores, and/or a narration. The plurality of different graphical content 120 may be available for different types of media devices 102 and/or the portable media devices 118.

In an exemplary embodiment, an identifier of the media device 102 and/or portable media device 118 may be received by the media rich content server 108. Accordingly, the format of the graphical content 120 may be tailored for presentation by that particular media device 102 and/or portable media device 118. The identifying information may be a serial number, a cellular number, a device make and/or model identifier, or another suitable identifier that indicates the type of and/or characteristics of the media device 102 and/or portable media device 118. For example, the portable media device 118 may be a cellular phone with a small display. The media rich content server 108 may then provide the supplemental media rich content that is suitable for presentation on that particular display. On the other hand, the portable media device 118 may be a sophisticated electronic device where the display 124 is touch sensitive and relatively large. The media rich content server 108 may then provide the supplemental media rich content in a larger size, and may optionally include interactive features that are configured to be responsive to input from the touch sensitive display 124.

The graphical content 120 may be presented in any suitable fashion with respect to the presented video portion of the program of interest. For example, the program of interest and the graphical content 120 may be presented in a side-by-side format as illustrated in FIG. 1. Alternatively, the graphical content 120 may be overlaid on top of, or over a portion of, the presented program of interest. The graphical content 120 may be presented using a watermark format wherein the graphical content 120 is presented using some degree of transparency over the presented program of interest. Yet another presentation format may present the graphical content 120 in a banner form that presents text and or images. The graphical content 120 may even be presented as information that scrolls across the banner.

In some instances, the user may wish to access the media content received at their media device 102 when they are remote from the customer premises 112. In an exemplary embodiment, the user operates their portable media device 118 to establish a communication link to the content access device 104, via the network 126. In other embodiments, the portable media device 118 may access media content in other manners. Exemplary portable media devices 118 include, but are not limited to, laptop computers, personal device assistants (PDAs), netbooks, cellular-based devices, Internet accessible devices, and/or Wi-Fi accessible devices.

In the exemplary embodiment, the content access device 104 is controllably connected to the media device 102 and is configured to cause the media device 102 to access a particular program of interest in accordance with a specification from the user. In an exemplary embodiment, the user may communicate instructions from their portable media device 118 to the content access device 104 to specify the channel that is providing the program of interest, to specify the station call sign of the source station that is broadcasting the program of interest, and/or to specify another suitable identifier of the program of interest. In some embodiments, the user may specify the program of interest by navigating about an electronic program guide (EPG). The content access device 104 receives the specified program of interest from the media device 102, and then transmits the program of interest to the user's portable media device 118. In an alternative embodiment, the media device 102 and the content access device 104 may be integrated together.

The content access device 104, in some embodiments, may be configured to reformat or process the program of interest into a format or the like that is compatible with the data requirements of the portable media device 118 and/or that is compatible with a data transmission bandwidth of the communication link to the portable media device 118. For example, the program of interest received from the media device 102 may be in a format that is suitable for presentation of a standard definition or high definition TV. In contrast, the portable media device 118 may be a cellular phone or a laptop computer with a relatively smaller display. Alternatively, or additionally, the communication link to the portable media device 118 may not have sufficient bandwidth to transmit the received format version of the program of interest to the portable media device 118. In such situations, the content access device 104 processes the program of interest into a format that is suited for transmission over the established link between the content access device 104 and the portable media device 118.

When the user selects an object of interest that is being presented on the program of interest, the portable media device 118 establishes a communication link to the media rich content server 108 so that the supplemental media rich content associated with the object of interest may be accessed by the portable media device 118 and presented as the graphical content 120 on the display 128. In some embodiments, the communication link between the content access device 104 and the portable media device 118 is established over the network 126. In other embodiments, a separate path may be used to establish the communication link between the content access device 104 and the portable media device 118.

For example, the user may wish to view the presentation of a football game while at a remote location. The user operates their portable media device 118 to establish the communication link to the content access device 104 and requests presentation of the football game. The football game is communicated from the media device 102 to the content access device 104. The content access device 104 may then reformat the media content carrying the football game to comply with bandwidth capacity limits and/or to comply with the display requirements of the particular portable media device 118. The formatted football game is then communicated over the network 126 to the portable media device 118. The user is then presented a video image of the football game on the display 128 of the portable media device 118. When the user selects an object of interest that is being presented on the program of interest, such as the exemplary football player 122, the portable media device 118 establishes a communication link to the media rich content server 108 so that the supplemental media rich content associated with the object of interest may be accessed by the portable media device 118 and presented as the graphical content 120 on the display 128.

Figure 2:
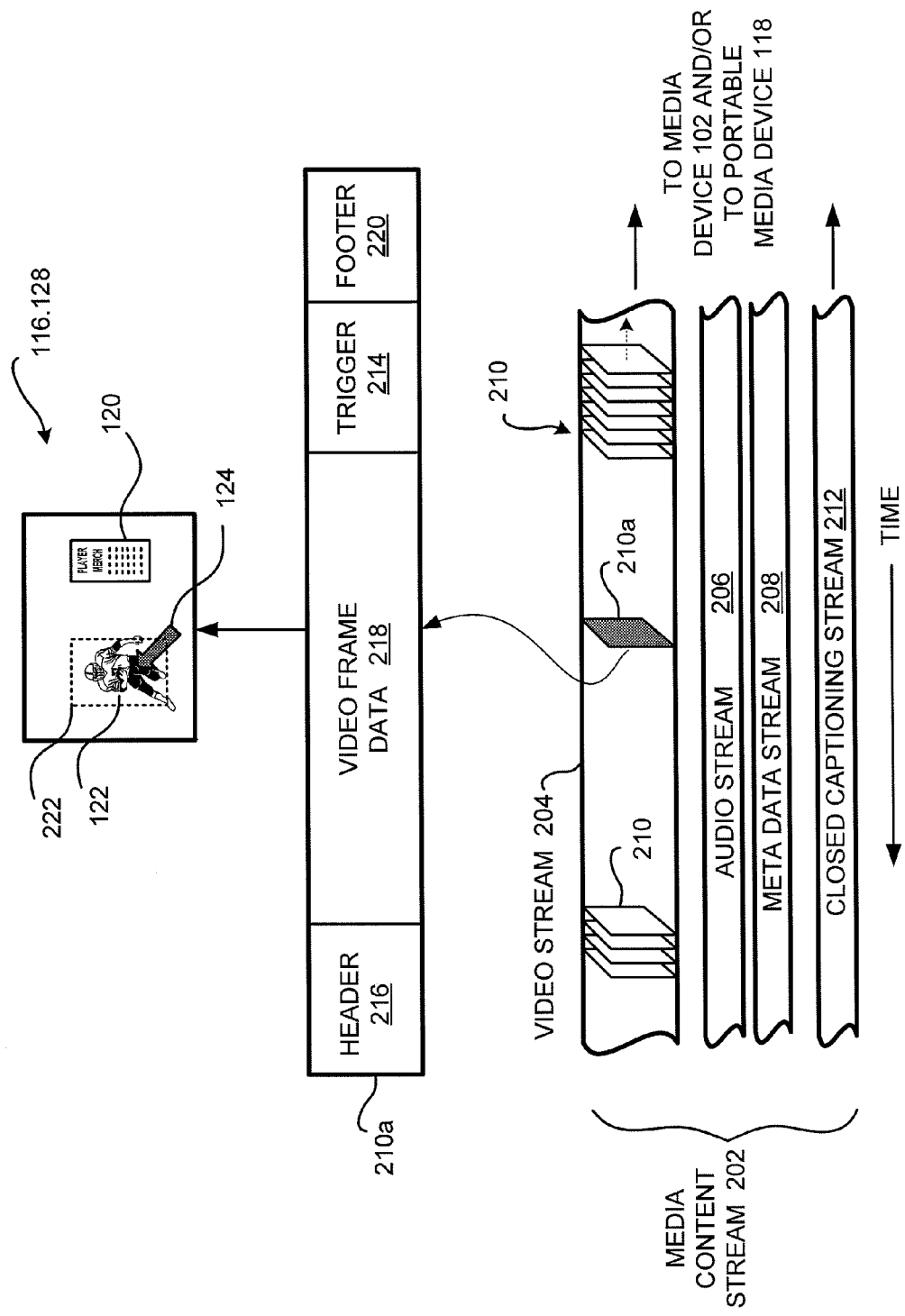
FIG. 2 conceptually illustrates a program stream that communicates, transports, or otherwise carries, the program of interest to a media device and/or a portable media device.

FIG. 2 conceptually illustrates a media content stream 202 that communicates, transports, or otherwise carries, the program of interest to the media device 102 and/or the portable media device 118. The media content stream 202 comprises a video stream 204, a corresponding audio stream 206, and a corresponding metadata stream 208.

The video stream 204 is comprised of a plurality of serially sequenced video frames 210. Each video frame 210 has data or information used to render and present a particular image of the program of interest. The video frames 210 are serially presented so as to create a moving picture. For example, the video frame 210a is used to generate the presented image that includes the image of the football player 122, where the football player is the object of interest that is associated with the graphical content 120.

The audio stream 206 may include spoken words, music, and background sounds. The audio stream 206 is sequenced with the video frames 210 such that spoken words, music, and background sounds of the audio stream 206 correspond in time with the moving picture. Some media content streams 202 may include a metadata stream 208 which contains other information of interest.

An optional closed captioning stream 212 is also conceptually illustrated as part of the media content stream 202. The closed captioning stream 212 is typically a textual presentation of the words of the audio stream 206 for hearing impaired viewers or for viewers in an area with relatively loud ambient noise levels, such as a bar or the like. The words of the closed captioning stream 212 are sequenced so as to generally correspond to the spoken words of the audio stream 206.

To provide access to the supplemental media rich content, exemplary embodiments of the media access system 100 incorporate information in a supplemental media rich content trigger 214 that resides in the video stream 204 of the media content stream 202 carrying the program of interest. In the illustrated exemplary embodiment, the trigger 214 is embedded or otherwise incorporated into the video frame 210. For example, recent moving picture experts group (MPEG) formats, the material exchange format (MXF), and other packetized video formats, now provide for portions in the video stream 204 that are configured to carry various non-video data.

In other embodiments, the trigger is associated with one or more of the video frames 210. For example, but not limited to, the trigger 214 may be interleaved or otherwise incorporated between video frames 210. As another example, the trigger 214 may be added or inserted into the video stream 204 between the video frame 210 associated with the generated trigger and an adjacent video frame 210. Alternatively, the trigger 214 may be embedded or otherwise incorporated into the audio stream 206, the metadata stream 208, and/or the closed captioning stream 212 of the media content stream 202. Alternatively, or additionally, the trigger 214 may be separately communicated to the media device 102 and/or the portable media device 118.

In an exemplary embodiment, each particular video frame 210 that presents a scene with the identified object of interest includes the supplemental media rich content trigger 214. The supplemental media rich content trigger 214 comprises information to identify the object of interest in the presented scene. For example, the video frame 210a is used to generate the presented image that includes the image of the football player 122. The supplemental media rich content trigger 214 includes information that identifies where the football player is in the video frame 210.

The exemplary video frames 210 comprise a header 216, video frame data 218, supplemental media rich content trigger 214, and a footer 220. The header 216 includes information that identifies the start of each video frame 210, and may include information that identifies various characteristics of the video frame 210. The footer 220 includes information that identifies the end of each video frame 210, and may also include information that identifies various characteristics of the video frame 210. The video frame data 218 includes the video data or information that is used to render the image that is presented on the displays 116 and/or 128. In exemplary embodiments, the supplemental media rich content trigger 214 may reside in or may be otherwise incorporated into any portion of the video frame 210.

In an exemplary embodiment, the trigger information in at least one of the supplemental media rich content triggers 214 comprises information used to establish the communication link between media rich content server 108 and the content access device 104, and/or establish the communication link between the media rich content server 108 and the portable media device 118. For example, a web site address and/or other information to access the supplemental media rich content may be included in the trigger information. When the supplemental media rich content trigger 214 having the information to establish the communication link is processed, embodiments automatically establish the communication link to the media rich content server 108. In some embodiments, once the communication link is established, subsequent supplemental media rich content triggers 214 do not need to have the information to establish and/or maintain the communication link so long as the communication link remains established when that subsequent supplemental media rich content trigger 214 is processed. In some embodiments, a later processed supplemental media rich content trigger 214 may have information that closes the communication link to the media rich content server 108, and/or that causes a change to different graphical content 120 presenting different supplemental media rich content.

The trigger information further comprises object location information that identifies the location of the object of interest in the presented image generated from the associated video frame 210. In response to processing an embedded supplemental media rich content trigger 214, the portion of the currently presented video frame 210 that includes the displayed object of interest is configured so that the object of interest presented in that particular video frame 210 becomes interactively selectable by the user. For example, the location of the football player 122 in the presented image will be included in the trigger information such that when the pointer 124 is located over or in proximity to the football player 122, the football player 122 becomes a selectable object of interest. In contrast, when the pointer 124 is located over other areas of the presented image that is generated from the video frame 210, the interactive object selection features of the object of interest are not active.

The location of the object of interest in the presented scene may be identified or described in any suitable manner. In an exemplary embodiment, a geometric region 222 is defined so that the geometric region 222 corresponds substantially to the location of the object of interest in the video frame 210. The geometric region 222 may be represented as any suitable region, such as a rectangular region, an oval region, a circular region, or a triangular region. For example, once the object of interest is identified in the video frame 210, the exemplary rectangular geometric region 222 may be used to define an area that encompasses all of, or a part of, the object of interest. Here, the location of the exemplary geometric region 222 may be identified or described by its "x" and "y" coordinates in the video frame 210. In other embodiments, the exemplary geometric region 222 may be identified by a vector or the like. In other embodiments, the geometric region 222 may more closely correspond to the object of interest. For example, if the object of interest is the exemplary football player 122, the geometric region 222 may correspond to the outline of the football player 122. Any suitable geometric region 222 may be defined and associated with the object of interest such that when the user navigates the pointer 124 or the like about the display to overlay, or be in proximity to, the geometric region 222, the supplemental media rich content trigger 214 becomes active and may be selectable by the user.

In alternative embodiments, some of the trigger information may be embedded in or otherwise incorporated into the audio stream 206, the metadata stream 208, and/or the closed captioning stream 212 of the media content stream 202. Alternatively, or additionally, the trigger information may be separately communicated to the media device 102 and/or the portable media device 118.

Alternatively, or additionally, the media rich content may be included in the media content stream 202. The media rich content may be part of the supplemental media rich content trigger 214 in an exemplary embodiment. The media rich content may be included in the video stream 204, the audio stream 206, the metadata stream 208, and/or the captioning stream 212 in other embodiments. Further, different media rich content may reside in different portions of the media content stream 202.

Figure 3:
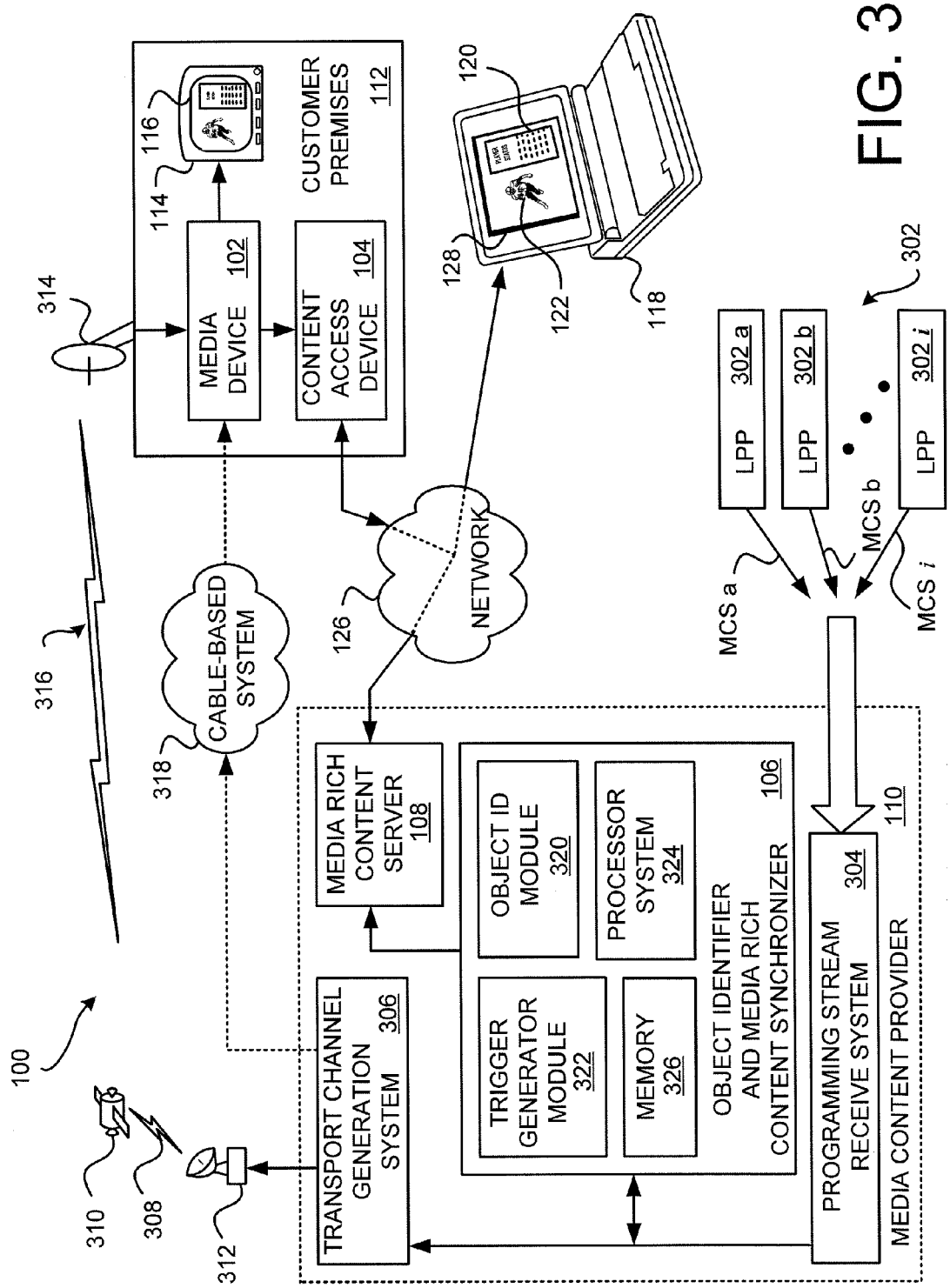
FIG. 3 illustrates in greater detail an exemplary embodiment of the media access system.

FIG. 3 illustrates in greater detail an exemplary embodiment of the media access system 100. To facilitate disclosure of the exemplary embodiment of the media access system 100, operation of the exemplary environment that provides media content to the media device 102 and/or the portable media device 118 is described.

The media content provider 110 receives the plurality of media content streams MCSa-MCSi from a plurality of local program providers (LPPs) 302 at its programming stream receive system 304. The programming stream receive system 304 processes the received media content streams MCSa-MCSi as necessary to prepare them for transmission to the customers. For example, commercials or the like may be incorporated with a particular one of the media content streams MCSa-MCSi. Further, the media content streams MCSa-MCSi may be associated with identifiers, such as channel number and/or station call signs.

The processed media content streams MCSa-MCSi are communicated from the programming stream receive system 304 to an optional transport channel generation system 306. In an exemplary satellite-based media system, the transport channel generation system 306 bundles selected ones of the media content streams MCSa-MCSi into one or more transport channels 308. Then, one or more of the transport channels 308 (with the media content comprising the supplemental media rich content triggers 214) are uplinked to a satellite 310, via a corresponding transmit antenna 312. The respective transport channels 308 are then communicated from the satellite 310 down to a receiver antenna 314 located at the customer premises 112. The received wireless signal 316 with the transport channel(s) 308 therein is then communicated to the media device 102. The receiver antenna 314 and the media device 102 may be configured to receive multiple transport channels from a plurality of satellites 310.

Alternatively, or additionally, media content comprising the supplemental media rich content triggers 214 may be provided to the media device 102 over other systems. For example, but not limited to, the media content system provider 110 may communicate the media content with the supplemental media rich content trigger 214 over a cable-based system 318. The cable-based system 318 may use a fiber optic cable, a coaxial cable, or the like that couples the media device 102 to the cable-based system 318.

Media content with the supplemental media rich content triggers 214 may be communicated to the media device 102 and/or to the portable media device 118 using other media. For example, the media content and the supplemental media rich content triggers 214 may be communicated over the Internet.

In another situation, the media content with the supplemental media rich content triggers 214 may be provided from a memory medium, such as a digital video disk (DVD) or the like. When the program of interest is retrieved from the memory medium, the supplemental media rich content triggers 214 cause the media device 102 and/or the portable media device 118 to access and present the graphical content 120 in the event that the user chooses to select the object of interest when it is visible on the image presented on the displays 116, 128.

In some situations, the program of interest with the supplemental media rich content triggers 214 may be saved into a storage medium or device, such as a digital video recorder (DVR) residing in the media device 102, saved into a hard drive residing in the portable media device 118, or saved into an external memory device that is coupled to the media device 102, the media presentation device 114, and/or the portable media device 118. When the stored program of interest with the supplemental media rich content triggers 214 is accessed by the media device 102 and/or portable media device 118, then the supplemental media rich content is accessed and presented to the user upon selection of the object of interest identified in the supplemental media rich content triggers 214.

The supplemental media rich content may be created by a variety of entities. In an exemplary application, the supplemental media rich content is created by the particular LPP 302 that is originating the program of interest. The supplemental media rich content is communicated from the originating LPP 302 to the programming stream receive system 304. The supplemental media rich content may then be communicated to the media rich content server 108 and/or the object identifier and media rich content synchronizer 106. In other situations, the supplemental media rich content may be communicated from the originating LPP 302 directly to the object identifier and media rich content synchronizer 106.

In an alternative application, the supplemental media rich content may originate from another source. The supplemental media rich content originating from other sources may be communicated to the media rich content server 108 and/or the object identifier and media rich content synchronizer 106. The received supplemental media rich content may then be saved for later access by the media device 102 and/or portable media device 118.

In an exemplary embodiment, the supplemental media rich content triggers 214 and object location information included in the triggers 214 are generated by the object identifier and media rich content synchronizer 106. An exemplary object identifier and media rich content synchronizer 106 comprises an object identification (ID) module 320, a trigger generator module 322, a processor system 324, and a memory 326.

The object ID module 320 is configured to recognize and/or identify a specified object of interest in a video frame 210. Further, the object ID module 320 is configured determine the location of the object of interest in the video frame 210.

The object ID module 320 comprises (and/or executes) object recognition logic that identifies and determines the location of object of interest in the video frame 210. The object recognition logic may be software that employs any suitable methodology that identifies and determines the location of the object of interest in the video frame 210. For example, but not limited to, the object ID module 320 may employ edge matching techniques, divide-and-conquer search techniques, color and/or grayscale matching techniques, gradient matching techniques, eigenvector analysis techniques, geometric hashing techniques, scale-invariant feature transform (SIFT) techniques, speeded up robust features (SURF) techniques, and/or template matching techniques.

Once the object of interest has been identified and location in the video frame 210, characteristics of the geometric region 222 and its location may be defined. The information defining the geometric region 222 corresponding to the identified location of the object of interest is then incorporated into the trigger information. In an alternative embodiment, the geometric region 222 may be defined by the known location of a point in the video frame 210. A larger geometric region 222 and the location of the larger generated geometric region 222 may be generated by the media device 102 and/or the portable media device 118.

In a series of sequentially presented video frames 210 that are used to generate a video clip of a particular scene having the object of interest presented therein, a difference in a shape, a size, an orientation, a color, a brightness, or other characteristic of the object of interest between adjacent ones of the video frames 210 is likely to be relatively small. Accordingly, rather than identifying and determining the location of object of interest in each and every video frame 210, the determined geometric region 222 that identifies and defines the location of the object of interest may be used for a plurality of video frames 210 where the characteristics of the object of interest in each of the video frames 210 are similar. If a comparison of the location information for the object in the video frames indicates that the same geographic information, or substantially the same geometric region 222, may be used to identify the object of interest in the plurality of video frames 210, then the determined geometric region 222 may be substituted for any of those video frames 210. For example, if the exemplary football player is in a huddle or is stationary before or after a game play, an exemplary embodiment may identify and determine the location of object of interest in a selected video frame 210. The determined trigger information identifying the location of the object of interest may then be substituted in adjacent or nearby video frames 210.

In some embodiments, the information that identifies and determines the location of object of interest in the video frames 210 may only be used in selected video frames 210. For example, if the display rate of the video frames 210 is one hundred frames per second, then the trigger information that that identifies and determines the location of object of interest in the video frame 210 may only be determined by the object ID module 320 in one or two of the video frames 210 presented during each second. Or, the information may be determined in video frames 210 that are temporarily separated from each other by a predefined durations, such as one or more seconds.

Further, in some embodiments, the supplemental media rich content triggers 214 may be added into the selected ones of the video frames 210. Because the user's perceptions of the presented video portion of the media content, and the user's reactions to changes in the location or other characteristics of the object of interest, is relatively slow compared to the rate of presentation of individual video frames 210, periodically incorporating the supplemental media rich content triggers 214 into the media content will be sufficient to enable the user to select the object of interest. That is, even though not all of the video frames 210 may have a supplemental media rich content trigger 214, enough of the video frames 210 will have the supplemental media rich content trigger 214 so that the user may effectively select an object of interest.

In some embodiments, the object recognition logic may reside in any suitable memory medium. In an exemplary embodiment, the object recognition logic resides in the memory 326. In some embodiments, the object ID module 320 may comprise firmware, and/or may comprise hardware. For example, the object ID module 320 may employ a dedicated and/or special purpose processor system.

The trigger generator module 322 is configured to generate a supplemental media rich content trigger 214, and its associated trigger information, based in part upon the location information of the object of interest determined by the object ID module 320. The trigger generator module 322 generates a supplemental media rich content trigger 214 for the associated video frame 210 having the specified object of interest.

In an exemplary embodiment, the processor system 324 is configured to execute the various logic that determines object location information, that generates the triggers 214 and the trigger information, and/or that associates the triggers 214 with the particular video frame 210 that presents the selectable object of interest. In an exemplary embodiment, the processor system 324 processes the media content to insert the triggers 214 into the video frames 210 that present the object of interest. In some embodiments, the processor system 324 may be configured to add the triggers 214 and/or trigger information into other locations in the media content stream 202. In alternative embodiments, multiple processor systems may be used to identify the location of the object of interest and/or define the associated geometric regions 222 where the object of interest is presented in the video frame 210. Alternatively, or additionally, the processor system 324 may perform other functions, and/or may comprise a plurality of processors operating in a distributed fashion and/or operating in parallel with each other.

In an exemplary embodiment, a single media rich content server 108 may have supplemental media rich content for a plurality of different objects of interest. Further, the media rich content server 108 may have different supplemental media rich content for a plurality of different media content streams. That is, other media devices 102 and/or the portable media devices 118 may concurrently access the media rich content server 108 to obtain supplemental media rich content pertaining to other media content, such as a movie, commercial, or the like.

In an exemplary embodiment, the supplemental media rich content may itself include links to other sources of supplemental media rich content. For example, the presented graphical content 120 may present selectable links to other supplemental media rich content that is available from other sources. For example, the graphical content 120 may present a uniform resource locator (URL) or the like that is selectable by the user. Alternatively, or additionally, the graphical content 120 may allow the user to access entirely different media content, such as a movie that is available from a video on demand (VOD) system or a program that is available on another channel. For example, the graphical content 120 may be similar to an electronic program guide (EPG), or provide a soft link to the EPG, so that the user may change to the identified program in the graphical content 120.

The network 126 is illustrated as a generic communication system. In an exemplary application, the network 126 comprises the Internet. Alternatively, or additionally, the communication network 126 may be a telephony system, a radio frequency (RF) wireless system, a microwave communication system, a fiber optics system, an intranet system, a local access network (LAN) system, a local network, an Ethernet system, a cable system, a radio frequency system, a cellular system, an infrared system, or a hybrid system comprised of multiple types of communication media.

In the various embodiments, the portable media device 118 may comprise a suitable modem or other component that is configured to cause the portable media device 118 to connect to the media rich content server 108 via the Internet. Alternatively, or additionally, the portable media device 118 may have a wireless transceiver that is configured to provide connectivity to a wireless system, such as a Wi-Fi system or the like. Alternatively, or additionally, the portable media device 118 may include a RF transceiver or the like that provides connectivity to a cellular network.

In some embodiments, the program of interest the media content comprising the supplemental media rich content triggers 214 may be received by the media rich content server 108. The media rich content server 108 monitors for the supplemental media rich content triggers 214, and then transmits (pushes) the supplemental media rich content to the portable media device 118. For example, the supplemental media rich content may be an interactive process that requires a relatively fast paced interaction with the user. By monitoring the trigger information at the media rich content server 108, the graphical content 120 may be more quickly presented to the user in response to a selection of the object of interest by the user.

Figure 4:
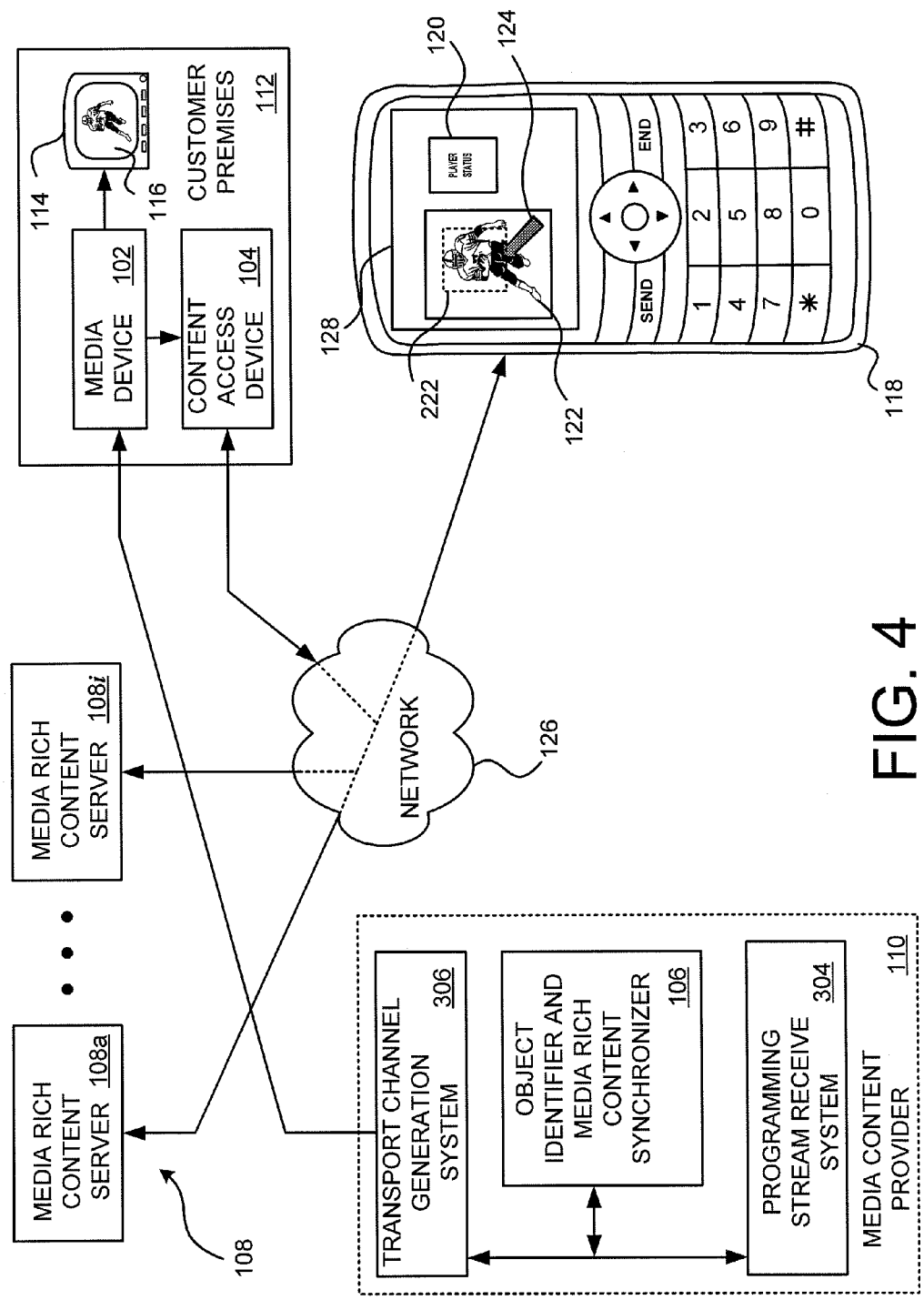
FIG. 4 is a block diagram of an embodiment of the media access system that employs a plurality of remotely located media rich content servers.

FIG. 4 is a block diagram of an embodiment of the media access system 100 that employs a plurality of remotely located media rich content servers 108. Each of the plurality of media rich content servers 108 may be located at any desired location where access to the network 126 is available. The trigger information includes sufficient information to identify the location of, and to establish a communication link with, the particular one of the media rich content servers 108 that has the supplemental media rich content associated with the program of interest that is being provided by the content access device 104.

In this exemplary system, the portable media device 118 is a cellular device that is configured to transmit and receive phone calls and/or to provide other media functions. In some instances, the user operates their portable media device 118 to establish a communication link to the content access device 104. In other instances, the supplemental media rich content trigger 214 automatically establishes a communication link between the portable media device 118 and the media rich content servers 108a-i that is providing the supplemental media rich content associated with the program of interest.

In this exemplary embodiment, the media rich content servers 108a-i are located remote from the location of the media content provider 110. For example, a first media rich content server 108 may be located at the facilities of the local program provider (LPP) that originates the program of interest. Another media rich content server 108 may be located at the site of a merchandiser that is marketing merchandise related to the selected object of interest. The exemplary portable media device 118 then directly accesses the particular media rich content servers 108a-i that has the supplemental media rich content associated with the selected object of interest.

In the various embodiments, the media rich content servers 108 are configured to be concurrently accessible by a plurality of different ones of the content access devices 104 and/or the portable media devices 118. Thus, a single media rich content server 108 may provide the same, or may provide different, supplemental media rich content to a plurality of concurrently connected content access devices 104 and/or the portable media devices 118 based on selected objects of interest.

Some embodiments may permit the user to selectively toggle between the presented program of interest and the presented graphical content 120. For example, when the display 128 of the portable media device 118 is relatively small, such as on a cellular phone, PDA, or the like, there may not be sufficient area on the display 128 to show both the program of interest and the supplemental media rich content with sufficient resolution and/or size. Accordingly, the graphical content 120 is presented separately from the program of interest. The graphical content 120 may be separately presented for some predefined duration and/or may be configured to await a response from the user. When the graphical content 120 is separately presented, some embodiments may be configured to pause the presentation of the program of interest. Presentation of the program of interest may then be resumed after presentation of the supplemental media rich content ends.

In the various embodiments, a plurality of different objects of interest may be identified in one video frame 210. A plurality of different supplemental media rich content triggers 214 may be generated for each object and included in the media content stream 202. For example, the media content may concurrently present a first object of interest and a second object of interest. Accordingly, the user may select among the first and second objects of interest, and upon selecting one of the presented plurality objects of interest, the graphical content 120 associated with that particular object of interest is presented to the user. Further, some embodiments may be configured to permit the user to make multiple selections of different objects of interest. When the user selects multiple objects of interest, a corresponding number of different graphical content 120 is presented to the user.

In some embodiments where multiple objects or interest are concurrently presented, the communication links to respective media rich content servers 108 are concurrently open. Further, if the user selects two or more objects of interest, multiple graphical content 120 may be concurrently displayed to the user.

An unexpected social benefit provided by the various embodiments of the media access system 100 is to improve content accessibility for individuals with impairments or disabilities. For example, a user with a hearing impairment may have opportunities to selectively access graphical and/or textual information that is being covered in the audio portion of the content stream. If the audio portion of the media content is being presented in a language that is different from the native language of the user, the user may have opportunities to selectively access graphical and/or textual information that is being covered in the audio portion of the content stream, which may be presented in any suitable language.

In some instances, where the media rich content is included in the video stream 204, user selection of the object of interest causes the media rich content residing in the media content stream 202 to be accessed so that the media device 102 and/or the portable media device 118 generate and present the graphical content 120. Further, one or more of the media rich content servers 108a-i may be accessed to obtain additional media rich content.

In an alternative embodiment, for at least one supplemental media rich content trigger 214, the media device 102 accesses the media rich content from one or more of the media rich content servers 108a-i when a supplemental media rich content trigger 214 is processed. The accessed media rich content may then be incorporated into the media content stream 202 and/or may be separately communicated to the portable media device 118.

It should be emphasized that the above-described embodiments of the media access system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method for presentation of supplemental media rich content, the method comprising:
  receiving at a media device a first video frame in a video stream comprising at least a plurality of video frames, wherein the first video frame is configured to present an object of interest;
  processing a first supplemental media rich content trigger associated with the object of interest of the first video frame, wherein the first supplemental media rich content trigger comprises:
    first location information that identifies a first region where the object of interest is presented in the video frame,
    first content access information configured to access supplemental media rich content associated with the object of interest from a media rich content server, and
    a communication link establishment request;
  establishing a communication link between the media device and the media rich content server in response to the communication link establishment request;
  receiving at the media device at least one second video frame in the video stream, wherein the second video frame is received after the first video frame, and wherein the second video frame is configured to present the object of interest;
  processing a second supplemental media rich content trigger associated with the at least one second video frame, wherein the second supplemental media rich content trigger comprises:
    second location information that identifies a second region where the object of interest is presented in the video frame, and second content access information configured to access the supplemental media rich content associated with the object of interest from the media rich content server, receiving a user selection of the object of interest, wherein the user selection is received after media device begins to establish the communication link;

accessing the supplemental media rich content from the media rich content server over the communication link in response to the user selection of the object of interest;

presenting the supplemental media rich content on a presentation device;

processing a third supplemental media rich content trigger after processing of the second supplemental media rich content trigger, wherein the third supplemental media rich content trigger comprises a communication link closing request; and closing the communication link in response to the communication link closing request.

2. The method of claim 1, wherein the video stream comprises the first, second and third supplemental media rich content triggers associated with the at least one first and second video frames.

3. The method of claim 1, wherein the first and second supplemental media rich content triggers reside respectively in the data of the first and second video frames.

4. The method of claim 1, further comprising:
receiving the supplemental media rich content from the media rich content server.

5. The method of claim 4, wherein the object of interest is a first object of interest, the media rich content server is a first media rich content server, wherein the first supplemental media rich content trigger comprises information that identifies a first region where the first object of interest is presented in the video frame, wherein the presented supplemental media rich content is first supplemental media rich content, wherein the at least one video frame is configured to concurrently present the first object of interest and a second object of interest, and further comprising:

processing a fourth supplemental media rich content trigger associated with the at least one video frame, wherein the fourth supplemental media rich content trigger comprises information that identifies a second region of the second object of interest in the video frame, and comprises information configured to access a second media rich content server having second supplemental media rich content associated with the second object of interest;

receiving a user selection of the second object of interest presented in the at least one video frame;

establishing a second communication link to the fourth media rich content server in response to the received user selection of the second object of interest;

receiving the second supplemental media rich content from the second media rich content server; and presenting the second supplemental media rich content.

6. The method of claim 5, wherein the communication link to the first media rich content server and the communication link to the second media rich content server are concurrently open.

7. The method of claim 5, further comprising:
concurrently presenting the first supplemental media rich content and the second supplemental media rich content.

8. The method of claim 1, wherein a communication link is established between a portable media device and the media device, and further comprising:

processing the received video stream into a processed video stream configured for communication to the portable media device, wherein the processed video stream comprises the first, second and third supplemental media rich content triggers;

communicating the processed video stream from the media device to the portable media device;

processing at the portable media device the first, second and third supplemental media rich content triggers;

establishing a communication link between the portable media device and the media rich content server in response to the communication link establishment request;

receiving at the portable media device the user selection of the object of interest presented in the at least one video frame, wherein the user selection is received after the portable media device begins to establish the communication link;

receiving at the portable media device the supplemental media rich content from the media rich content server over the communication link between the portable media device and the media rich content server established by the first supplemental media rich content trigger; and presenting the supplemental media rich content on the portable media device.

9. The method of claim 1, wherein the supplemental media rich content is an interactive supplemental media rich content configured to receive a user response.

10. The method of claim 1, further comprising:
sensing location of a pointer on the presented video frame corresponding to a geometric region in the video frame where the object of interest is presented; and sensing actuation of the pointer, wherein the actuation of the pointer corresponds to receiving the user selection.

11. A method for presentation of supplemental media rich content, the method comprising:
identifying an object of interest in a first video frame;

determining a first geometric region in the first video frame corresponding to a first location in the first video frame where the object of interest is presented;

generating a first supplemental media rich content trigger associated with the object of interest, wherein the first supplemental media rich content trigger comprises:

first location information corresponding to the first geometric region;

a communication link establishment request configured to cause a media device to establish a communication link between the media device and a media rich content server having supplemental media rich content associated with the object of interest; and first content access information configured to access supplemental media rich content associated with the object of interest from the media rich content server;

identifying the object of interest in a second video frame, wherein the second video frame is presentable after presentation of the first video frame;

determining a second geometric region in the second video frame corresponding to a second location in the second video frame where the object of interest is presented;

generating a second supplemental media rich content trigger associated with the object of interest, wherein the second supplemental media rich content trigger comprises:

second location information corresponding to the second geometric region; and second content access information configured to access the supplemental media rich content associated with the object of interest from the media rich content server;

wherein communication link establishment information is absent from the second supplemental media rich content trigger, and wherein the supplemental media rich content is accessed from the media rich content server by the media device over the communication link established by the first supplemental media rich content trigger in response to user selection of the object of interest;

incorporating the generated first and second supplemental media rich content triggers into a media content stream wherein the first and second video frames reside; and generating a third supplemental media rich content trigger associated with the object of interest, wherein the third supplemental media rich content trigger comprises communication link closing information, wherein the communication link between the media device and the media rich content server is established in response to receiving the first supplemental media rich content trigger and is closed in response to receiving the third supplemental media rich content trigger.

12. The method of claim 11, wherein incorporating the generated supplemental media rich content trigger into the media content stream comprises:
incorporating the generated first supplemental media rich content trigger into a portion of the first video frame; and
incorporating the generated second supplemental media rich content trigger into a portion of the second video frame.

13. The method of claim 11, wherein incorporating the generated first supplemental media rich content trigger into the media content stream comprises:
interleaving the generated first supplemental media rich content trigger between the first video frame and an adjacent video frame.

14. The method of claim 11, wherein the first geometric region in the first video frame substantially corresponds to the second geometric region in the second video frame, and further comprising:
substituting the information corresponding to the first geometric region for the information corresponding to the second geometric region when the second supplemental media rich content trigger is generated.

15. The method of claim 11, wherein the first video frame and the second video frame are separated by a predefined duration, and wherein additional supplemental media rich content triggers are omitted for a plurality of video frames located between the first video frame and the second video frame.

16. The method of claim 11, wherein incorporating the generated supplemental media rich content trigger into the media content stream comprises:
incorporating the generated first supplemental media rich content trigger into a portion of the first video frame;
incorporating the generated second supplemental media rich content trigger into a portion of the second video frame; and
incorporating the generated third supplemental media rich content trigger into a portion of a third video frame, wherein the third video frame is presentable after presentation of the second video frame.

17. A system, comprising:
an object identification module configured to identify an object of interest in a first video frame and a second video frame that is presented after the first video frame, configured to determine a first geometric region in the first video frame corresponding to a location in the first video frame where the object of interest is presented, and configured to determine a second geometric region in the second video frame corresponding to a location in the second video frame where the object of interest is presented;

a trigger generator module configured to:

generate a first supplemental media rich content trigger associated with the object of interest, wherein the first supplemental media rich content trigger comprises first location information corresponding to the first geometric region, comprises communication link establishment request configured to cause a media device to establish a communication link between the media device and a media rich content server having supplemental media rich content associated with the object of interest, and comprises access information configured to cause the media device to access the media rich content server to receive the supplemental media rich content associated with the object of interest; and generate a second supplemental media rich content trigger associated with the object of interest, wherein the second supplemental media rich content trigger comprises second location information corresponding to the second geometric region, and comprises access information configured to cause the media device to access the media rich content server to receive the supplemental media rich content associated with the object of interest over the communication link established by the first supplemental media rich content trigger in response to user selection of the object of interest; and generate a third supplemental media rich content trigger associated with the object of interest, wherein the third supplemental media rich content trigger comprises communication link closing information, wherein the communication link between the media device and the media rich content server is established in response to receiving the first supplemental media rich content trigger and is closed in response to receiving the third supplemental media rich content trigger; and a processor system configured to incorporate the generated first supplemental media rich content trigger into a media content stream wherein the first video frame resides, and is configured to incorporate the generated second supplemental media rich content trigger into a media content stream wherein the second video frame resides.

18. The system of claim 17, wherein the processor system is further configured to incorporate the generated first supplemental media rich content trigger into a portion of the first video frame, and is configured to incorporate the generated second supplemental media rich content trigger into a portion of the second video frame.

19. The system of claim 17, wherein communication link establishment information is absent from the second supplemental media rich content trigger.

* * * * *